United States Patent
Sun

(10) Patent No.: US 8,520,568 B2
(45) Date of Patent: Aug. 27, 2013

(54) MULTIPLE SPATIAL CHANNEL TRANSMISSION WITH RATE CONTROL

(75) Inventor: Yanmeng Sun, Shanghai (CN)

(73) Assignees: Koninklijke Philips N.V., Eindhoven (NL); Sharp Corporation, Osaka (JP)

(*) Notice: Subject to any disclaimer, the term of this patent is extended or adjusted under 35 U.S.C. 154(b) by 843 days.

(21) Appl. No.: 12/096,194

(22) PCT Filed: Dec. 7, 2006

(86) PCT No.: PCT/IB2006/054657
§ 371 (c)(1),
(2), (4) Date: Jun. 5, 2008

(87) PCT Pub. No.: WO2007/066307
PCT Pub. Date: Jun. 14, 2007

(65) Prior Publication Data
US 2008/0304468 A1    Dec. 11, 2008

(30) Foreign Application Priority Data
Dec. 9, 2005  (CN) .......................... 2005 1 0129493

(51) Int. Cl.
*H04J 3/22*  (2006.01)
*H04J 3/16*  (2006.01)
*H04B 7/00*  (2006.01)

(52) U.S. Cl.
USPC ........................ 370/310; 370/465; 370/468

(58) Field of Classification Search
None
See application file for complete search history.

(56) References Cited

U.S. PATENT DOCUMENTS

| | | | |
|---|---|---|---|
| 7,542,446 B2* | 6/2009 | Mehta et al. | 370/330 |
| 2003/0148770 A1 | 8/2003 | Das et al. | |
| 2004/0027994 A1 | 2/2004 | Baines | |
| 2004/0086058 A1* | 5/2004 | Eckhardt et al. | 375/295 |
| 2004/0196919 A1* | 10/2004 | Mehta et al. | 375/267 |
| 2004/0266484 A1 | 12/2004 | Kogiantis et al. | |
| 2005/0075073 A1* | 4/2005 | Kadous et al. | 455/63.1 |
| 2005/0213682 A1 | 9/2005 | Han et al. | |
| 2006/0203950 A1* | 9/2006 | Chung et al. | 375/376 |

FOREIGN PATENT DOCUMENTS

WO  WO2004102863 A1  11/2004
WO  WO2005032154 A2   7/2005

OTHER PUBLICATIONS

Wolniansky et al: "V-Blast: An Architecture for Realizing Very High Data Rates Over the Rich-Scattering Wireless Channel"; Proceedings of the ISSSE, Pisa, Italy Sep. 1998, Signals, Systems, and Electronics, IEEE 1998, pp. 295-300.

(Continued)

*Primary Examiner* — Kevin C Harper
*Assistant Examiner* — Samina Choudhry

(57) ABSTRACT

A MIMO ARC transmitter derives demux streams (15, 20) carrying different parts of the information, at given data rates, processes each demux stream by coding and modulation (25, 30) before transmission over the channels, and varies (50, 165) the coding or modulation according to channel conditions, and controls the data rates (50, 155) according to conditions of the channels independently of the variations in coding and modulation. The separate control of processing and of data rates for each demux stream can provide a better balance of rapid response to changing conditions and efficiency in less rapidly changing conditions. The frequency of updating the processing can be limited since these take more time to adapt in the receiver. Sensitivity to rapid changes can be achieved by the data rate changes since these involve less overhead than changes in the processing.

15 Claims, 6 Drawing Sheets

(56) References Cited

OTHER PUBLICATIONS

Jungnickel et al: "Over-the-Air Demonstration of Spatial Multiplexing At High Data Rates Using Real-Time Base-Band Processing"; Advances in Radio Science (2004) 2: pp. 135-140.

Kim et al: "On the Performance of Multiuser MIMO Systems in Beyond 3G:Beamforming, Feedback and Scheduling"; 13th Meeting of Wireless World Research Forum, Mar. 2-3, 2005, Jeju Island, Korea, 7 Page Document.

Sanayei et al: "Antenna Selection in MIMO Systems"; IEEE Communications Magazine, Oct. 2004, pp. 68-73.

Lucent Technologies: "Status Report for MIMO Physical Layer to TSG", Lucent TSGR1#20(03) 0237, Jun. 3-6, 2003, Hameenlinna, Finland, 1 Page Document.

Lucent Technologies: "Increasing MIMO Throughput With Per-Antenna Rate Control"; TSG-R1 (01) 0879, Aug. 27-31, 2001, 14 Page Document.

* cited by examiner

| data rate (Mbps) | modulation | code rate | required SINR (dB) |
|---|---|---|---|
| 2.4 | QPSK | 1/2 | -Infinity |
| 3.6 | QPSK | 3/4 | 3.5 |
| 4.8 | 16QAM | 1/2 | 5.8 |
| 7.2 | 16QAM | 3/4 | 9.5 |

MULTIPLE SPATIAL CHANNEL TRANSMISSION WITH RATE CONTROL

This invention relates to a transmitter, a baseband processor for a transmitter, and to a method of transmitting information.

It is known to provide multiple antenna wireless communication systems which exploit multiple spatial channels in the transmission medium between a transmitter and a receiver, to simultaneously transmit multiple different information streams, or to simultaneously transmit multiple copies of the same information redundantly. In the first case the capacity is increased, and in the second case the quality or robustness can be increased. Such multiple antenna wireless communication systems are known as MIMO (multiple input multiple output) systems, where there are multiple antennas at both ends. They are known as MISO (multiple input single output) and SIMO (single input multiple output) where there is only a single antenna at the receiver or transmitter respectively. The multiple data streams can be referred to as MIMO channels or spatial channels, to distinguish from frequency channels, time division channels or code channels.

The transmitted data streams may experience different channel conditions, such as different fading and multipath effects, and so have different signal to noise ratios (SNRs). Since the channel conditions typically vary with time, the data rate supported by each channel may vary with time. If the characteristics of each MIMO channel, such as SNRs for the data streams, are known at the transmitter, then the transmitter may be able to determine a particular coding and modulation scheme for each data stream adaptively with closed loop control to achieve a desired channel SNR. However, for some MIMO systems, this information is not available at the transmitter, so these are open loop systems.

Per-Antenna Rate Control (PARC) is a multiple path, multiple antenna MIMO technique that has been proposed within the Third Generation Partnership Project (3GPP). Within 3GPP, PARC is applied to code division multiple access (CDMA) systems but the method is also applicable to systems without spreading or employing other transmission techniques, including OFDM (orthogonal frequency division multiplexing). FIGS. 1 and 2 show a transmitter and receiver respectively to illustrate how the PARC scheme operates.

Referring to FIG. 1, a bit-stream to be transmitted is split by a demultiplexer 15 into a number of streams each carrying different information and possibly different dates. Each stream has (potentially different) modulation and coding applied as well as interleaving by a stage 25. The streams are routed by a stage 35 to transmitter output stages 45 for transmission via separate antennas 48. At the receiver (see FIG. 2) a number of antennas 68 equal to or greater than the number of transmit-antennas 48 is typically required. The signal at each receive antenna 68 is a combination of the signals transmitted from each transmit antenna 48. The receiver can apply an algorithm such as Minimum Mean Square Error (MMSE) estimation or MMSE plus Successive Interference Cancellation (SIC) in order to estimate the symbols of each transmit stream. The receiver may also provide feedback to the transmitter of measurements of the channel quality, for example signal to interference-and-noise ratio (SINR), for each transmitted stream. The transmitter may use this information in deciding the appropriate modulation and coding for each demux stream. If one channel has a lower SINR and so a demux stream is changed to a lower order modulation scheme, this will require a lower data rate and so other demux streams are changed to higher order schemes with higher data rates to compensate.

PARC can achieve spatial multiplexing gains by the simultaneous transmission of multiple data streams using the same time and frequency resources but different 'spatial' resources, i.e. multiple transmit antennas. These simultaneous transmissions might be destined for a single receiving unit, or for different receiving units. In the latter case this is referred to as Spatial Division Multiple Access (SDMA). PARC may be considered as a refinement of the original BLAST family of spatial multiplexing techniques that includes rate adaptation of the spatially multiplexed streams, as described in "V-BLAST: An Architecture for Realising Very High Data Rates Over the Rich-Scattering Wireless Channel", Wolniansky P. W. et al, Proc. ISSSE 98, Pisa, September 1998.

It is known from US 2004/0266484 to provide a multiple channel system having feedback to a base station transmitter of long term and short term information about channel parameters or phase of the correlation between antennas. The long term information changes at a slower rate than the short term information, so is transmitted less frequently than the short term information. Consequently, the bandwidth needed for the feedback can be reduced.

It is an object of the invention to provide improved apparatus or methods.

According to a first aspect of the invention there is provided a transmitter for transmitting information using multiple spatial wireless channels, comprising a demultiplexer arranged to derive two or more demux streams carrying different parts of the information, at respective data rates, a stream processor for processing the demux streams before transmission over the channels, and a controller arranged to vary the processing according to channel conditions, the controller additionally being arranged to control the data rates according to conditions of the channels independently of the variations in the processing.

Controlling the data rates of the demux streams independently of the variations in the processing means the transmissions can be adapted to the channel conditions more quickly since a change of data rate involves less overhead than a change in the processing. This overhead is in many cases particularly acute in the receiver if it needs to carry out an inverse of the processing. The changes in processing are useful to improve the efficiency in terms of overall data rate and bit error rate for a given bandwidth, and given channel conditions. So the separate control of processing and of data rates for each demux stream can provide a better balance of rapid response to changing conditions and efficiency in less rapidly changing conditions.

This is based on a recognition that the receiver can handle changes in data rate more easily than changes in processing, particularly where the processing involves blocks or sequences of data such as error detection coding, interleaving, or modulation into symbols, or matrix or Fourier transform operations for example. Thus the data rates for the multiple channels can be changed more frequently.

An additional feature of some embodiments is the controller being arranged to control the data rates more frequently than the variations in the processing. This enables the rapid response to changes in conditions with less computation overhead.

An additional feature of some embodiments is the controller being arranged to vary the data rates relative to each other and maintain an overall data rate to suit a data source. This is particularly useful for reducing buffering for example. The data source can comprise multiple users.

An additional feature of some embodiments is the stream processor having any one or more of: an error detection encoder, an error correction encoder, and a modulator, and the variations comprising any one or more of: type of coding, amount of redundancy in the coding, type of modulation, and allocation of sub-carriers in a sub-carrier type modulation. These are some of the principal ways of enhancing efficiency of transmission.

An additional feature of some embodiments is the controller being arranged to control the data rates within a variable range, the range being varied with a slower response than the control of the data rates. This can make the control more stable during rapid changes, and reduce errors from the control becoming unstable.

An additional feature of some embodiments is the controller being arranged to receive feedback of the shorter term channel conditions and of a longer term overall error rate from a receiver. This can provide more accurate information than estimates or extrapolations of channel conditions, and the overall error rate feedback means that errors in the inverse processing in the receiver, and statistical properties over time, can be included in the control loops, to improve the control.

An additional feature of some embodiments is the control of the data rates being according to the channel conditions within constraints determined according to the longer term overall error rate. This can help improve stability of control.

An additional feature of some embodiments is the variation of the processing being updated at a lower frequency than an update frequency of the data rates, and being according to the longer term overall error rate. The overall error rate feedback means that errors in the inverse processing in the receiver, and statistical properties over time, can be included in the control loop. This can improve the stability of the control, and the lower update frequency can help avoid unnecessary or frequent short term variations in processing.

Another aspect of the invention provides a baseband processor for the transmitter, comprising a demultiplexer arranged to derive two or more demux streams carrying different parts of the information, at respective data rates, a stream processor for processing the demux streams before conversion to radio frequency for transmission over the channels, and a controller arranged to vary the processing according to channel conditions, the controller additionally being arranged to control the data rates according to conditions of the channels independently of the variations in the processing.

Another aspect provides a corresponding method of transmitting information having the steps of deriving two or more demux streams carrying different parts of the information, at respective data rates, processing each demux stream before transmission over the channels, varying the processing according to channel conditions, and controlling the data rates according to conditions of the channels independently of the variations in the processing. Other corresponding features can be added to the method.

Additional features and advantages will be described below. Any of the additional features can be combined together or with any of the aspects of the invention, as would be apparent to those skilled in the art. Other advantages may be apparent to those skilled in the art, especially over other prior art not known to the inventors.

Embodiments of the invention will now be described by way of example only, and with reference to the accompanying drawings, in which.

Before describing the embodiments in more detail, features of a typical MIMO system will be explained. A MIMO communication system employs multiple ($N_T$) transmit antennas and multiple ($N_R$) receiver antennas. A MIMO channel formed by $N_T$ transmit antennas and $N_R$ receiver antennas can be decomposed to $N_S$ independent spatial channels, where $N_S \leq \min(N_T, N_R)$. The MIMO system can provide improved performance if the additional channel capacity created by multiple transmit and receive antennas is utilised.

In general, to sufficiently utilise the increase in transmission capacity, the original user data stream at the transmitter is allocated (i.e. de-multiplexed) onto multiple antennas as a set of sub-data streams, here called demux streams. After some processing, such as space-time coding, the multiple transmit antennas send these demux streams simultaneously and these demux streams reach the receiver via $N_S$ independent spatial channels. The receive antennas collect these mixed demux streams, recover them respectively and finally reassemble them to recreate the original user data stream.

As mentioned above, since channel parameters in a wireless communication system can vary at all times and all $N_S$ spatial channels are independent, it is evident that parameters of all $N_S$ spatial channels are not constants either. To best utilise all $N_S$ spatial channels for data transmission, Antenna Rate Control (ARC) technology is introduced into the MIMO system to dynamically assign appropriate data transmission parameters, such as data rate, modulation mode and code rate, to each transmit antenna.

Figure 1:
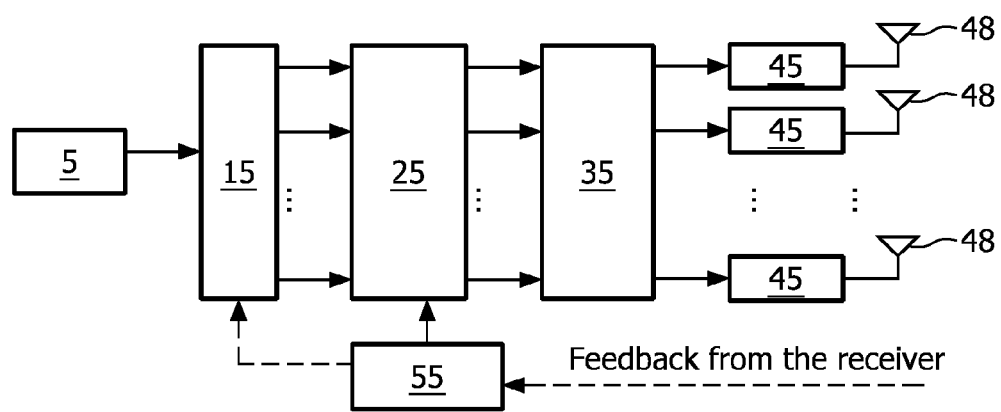
FIGS. 1 and 2 show schematic views of a transmitter and a receiver respectively according to a known PARC type arrangement.

FIG. 1 shows a block diagram of a known ARC MIMO system. Data from a data source 5 is fed to a demultiplexer 15 which splits the data into a plurality of demux streams. The demux streams are fed to a coding and modulation part 25, then through a space-time processing part 35 to transmitter output stages 45 coupled to antennas 48. A rate controller 55 takes feedback from the receiver and controls the coding and modulation part 25 and makes changes to the demux stream data rates in the demultiplexer 15 warranted by changes in coding and modulation.

In general, the rate controller 55 in the transmitter collects the information about each spatial channel from the receiver and further determines the appropriate data rate, according to the selected modulation and coding mode, and appropriate antenna 48 for each channel according to a certain criterion. Then the demultiplexer 15 splits the original user data into $N_T$ demux streams with respective rates $r_0, r_1, \ldots r_{N_T-1}$ for transmission via the corresponding $N_T$ transmit antennas 48.

Figure 2:
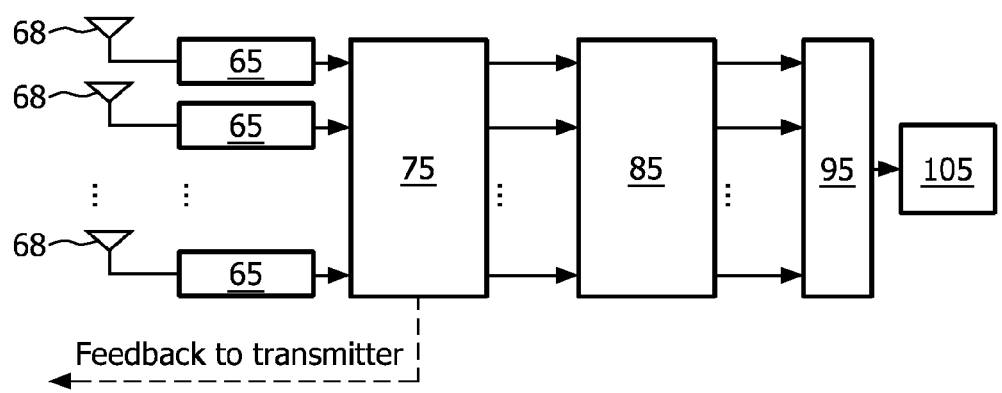

In the receiver the inverse procedure is executed. FIG. 2 shows the corresponding receiver having a number of receive antennas 68, receive circuitry 65 for each receive antenna 68, a receiver space-time processor 75, followed by a decoding and demodulation part 85, followed by a re-multiplexer 95 which feeds a data sink 105. The $N_R$ antennas 68 receive a mix of signals from each of the $N_T$ transmit antennas 48 and successive modules 65, 75, 85 recover the $N_T$ demux streams having rates $r_0, r_1, \ldots r_{N_T-1}$ respectively and reassemble them in order into one data stream. The space-time processor 75 can determine signal to noise ratios of each spatial channel and feeds this information back to the transmitter.

Figure 3:
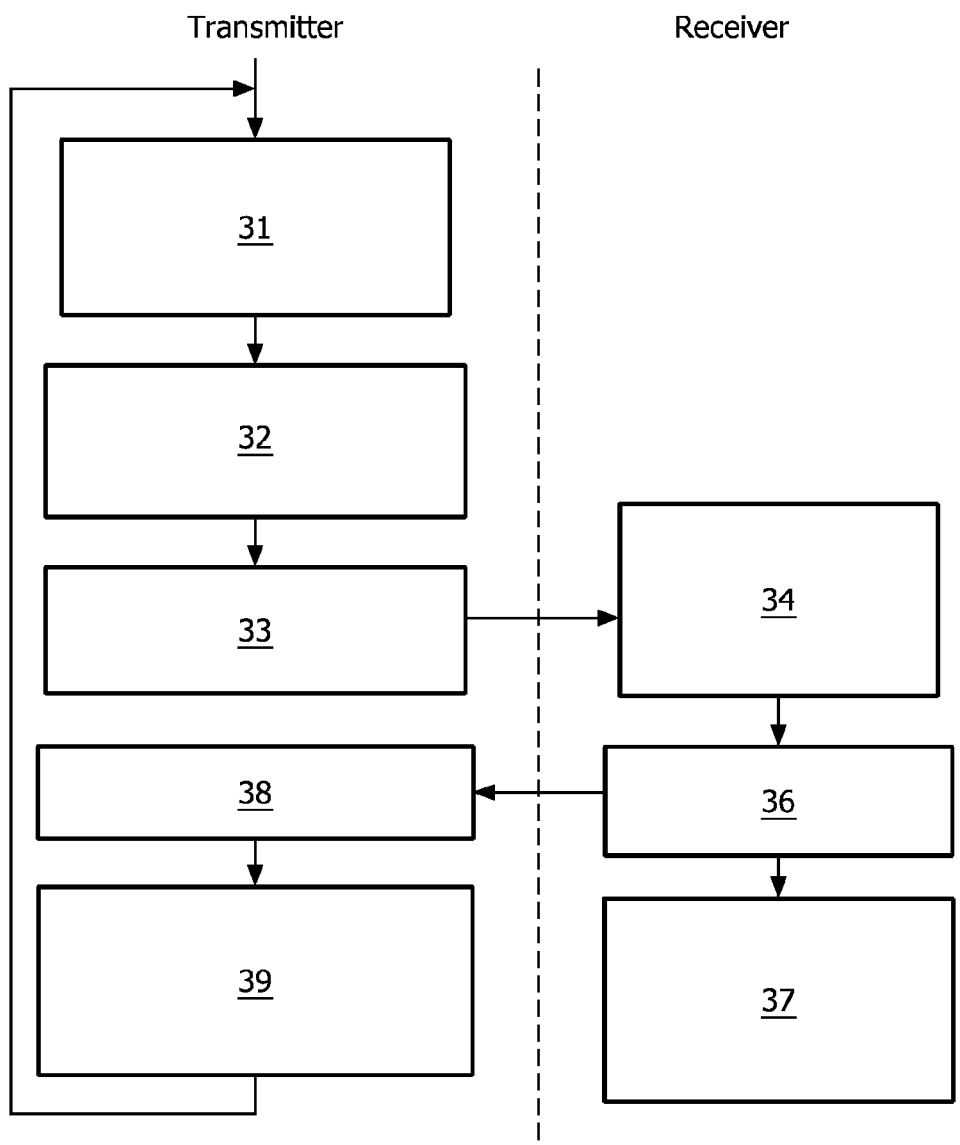
FIG. 3 shows a flow chart of the known operation.

So far, almost all ARC MIMO systems adopt closed-loop control methods and employ a channel metric and control criteria based on the receiver SINR, for example PARC (Per Antenna Rate Control), PU²RC (Per Unitary Basis Stream User and Rate Control), and S-PARC (Selective PARC). Implementation of these schemes can follow established practice, see for example; "Status Report for MIMO Physical Layer to TSG", Lucent, TSGR1#20(03) 0237, 3rd-6th, Jun., 2003, Hameenlinna, Finland; or "Increasing MIMO throughput with per-antenna rate control", Lucent, TSGR1(01)0879, 27th-31st August, Turino, Italy. The basic antenna rate control processing of these methods is summarised in the flow chart of FIG. 3. This shows steps of the transmitter on the left side and steps of the receiver on the right side with time flow represented down the chart. After setting initial transmission parameters such as modulation mode, code rate and data rate for each antenna, transmissions are started. At step 31 transmission parameters are selected for each transmit antenna, including modulation mode $M_0, M_1, \ldots M_{N_T-1}$, code rate $C_0, C_1, \ldots C_{N_T-1}$ and data rate $r_0, r_1, \ldots r_{N_T-1}$. At step 32 user data is split into demux streams having data rates $r_0, r_1, \ldots r_{N_T-1}$ and coding and modulating applied with the corresponding code rate $C_0, C_1, \ldots C_{N_T-1}$ and modulation mode $M_0, M_1, \ldots M_{N_T-1}$ respectively. At step 33, the transmitter transmits all space-time processed demux streams via the $N_T$ antennas.

At the receiver, at step 34, the receiver receives all signals via the $N_R$ antennas, and measures the SINR ($SINR_0$, $SINR_1, \ldots SINR_{N_T-1}$) of each channel. The receiver feeds back to the transmitter the SINR values at step 36. At step 37 the receiver continues the space-time processing, recovers all $N_T$ demux streams, and reassembles them in order to recreate the user data. The transmitter receives the feedback SINR values $SINR_0, SINR_1, \ldots SINR_{N_T-1}$ from the receiver at step 38, and at step 39, updates all transmission parameters ($r_0, r_1, \ldots r_{N_T-1}$), ($M_0, M_1, \ldots M_{N_T-1}$) and ($C_0, C_1, \ldots C_{N_T-1}$) according to the received SINR values $SINR_0, SINR_1, \ldots SINR_{N_T-1}$.

Figures 9, 10:
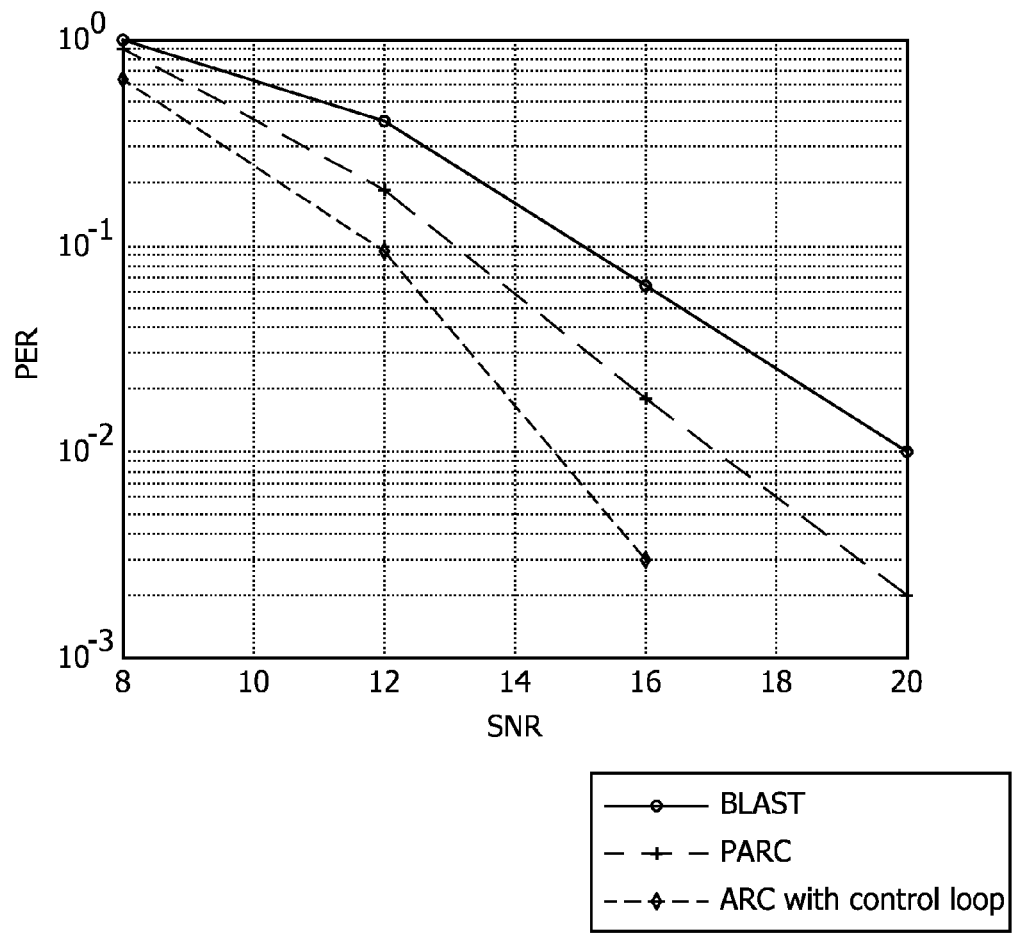
FIG. 9 is a graph of packet error rate PER versus channel signal to noise ratio SNR.
FIG. 10 is a table of transmission parameters and required SINR values in a PARC system.

Usually the ARC MIMO system selects a set of SINR values as threshold values for the adjustment of modulation mode and code rate, and therefore a predetermined data rate to suit the modulation and code rate. FIG. 10 is an example of transmission parameters and required SINRs in a PARC system.

As is known, the wireless channel conditions sometimes change rapidly and acutely due to the environment or due to mobility of the user. In these circumstances, the simple antenna rate control method described with reference to FIG. 3 and FIG. 10 may lead to some disadvantages as follows:

1. The adoption of only SINR criterion can lead to unreliable decisions about data rate control, and even result in degraded system performance in some extreme circumstances. The adjustment of transmission parameters may become out of step and even completely out of phase to the required corrections due to rapid changing of the conditions of the MIMO spatial channels. With accumulation of adjustment effects after a number of iterations of the control loop, the system performance may be degraded if a higher layer of a protocol stack frequently receives a succession of low SINR packets having a high bit error rate, and triggers many ARQ (automatic repeat request) procedures.
2. Acute variation in channel conditions leads to a fast changing SINR, and can lead to frequent and acute adjustment of transmission parameters on each antenna. The continual transmission mode adjustment at the transmitter results in complex processing being required at the receiver, which includes frequent modification of constellation de-mapping metrics, buffer depth for changed code rate, delay adjustment of each change of data rate of a demux stream, and so on.

The embodiments of the invention are concerned with a method of antenna rate control for a MIMO system, which can adjust transmission parameters more efficiently to address or mitigate the disadvantages mentioned above.

Figure 4:
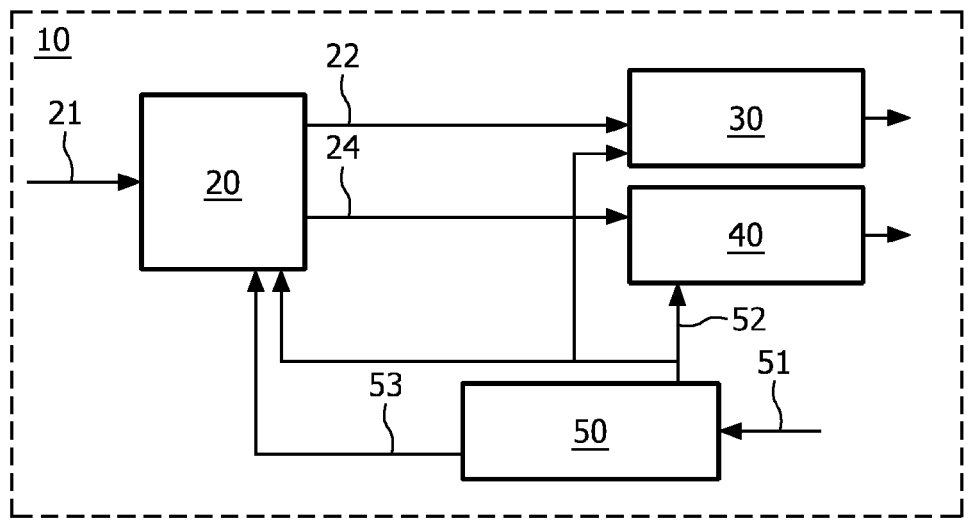
FIG. 4 shows a schematic view of a baseband processor for a transmitter according to an embodiment.

A first embodiment is shown in schematic form in FIG. 4, showing a baseband processor 10 for a transmitter. This shows a demultiplexer 20 having an input 21 for data to be transmitted and outputs 22, 24 for demux streams. The demux streams are fed to stream processors 30, 40 for processing each demux stream before they are transmitted. A controller 50 receives an indication of channel conditions on an input 51 and controls the stream processors 30, 40 according to the channel conditions by means of a first control signal on an output 52. The channel conditions can be estimates or actual feedback, and can be in various forms, such as individual channel SINR, time averaged values, overall bit error rates for all channels, packet error rates, ARQ rates, or combinations of these. The first control signal is sent to the demultiplexer 20 to alter the demux stream data rates dependent on the control of the processing. Notably the controller 50 is also sends a second control signal on an output 53 to the demultiplexer 20 to change the demux stream rates independent of the processing. The transmitter can be regarded as encompassing the parts typically implemented as a baseband processor, leading up to the associated radio frequency (RF) circuitry, and antennas, or can encompass the entire system including the RF circuitry and antennas.

Figure 5:
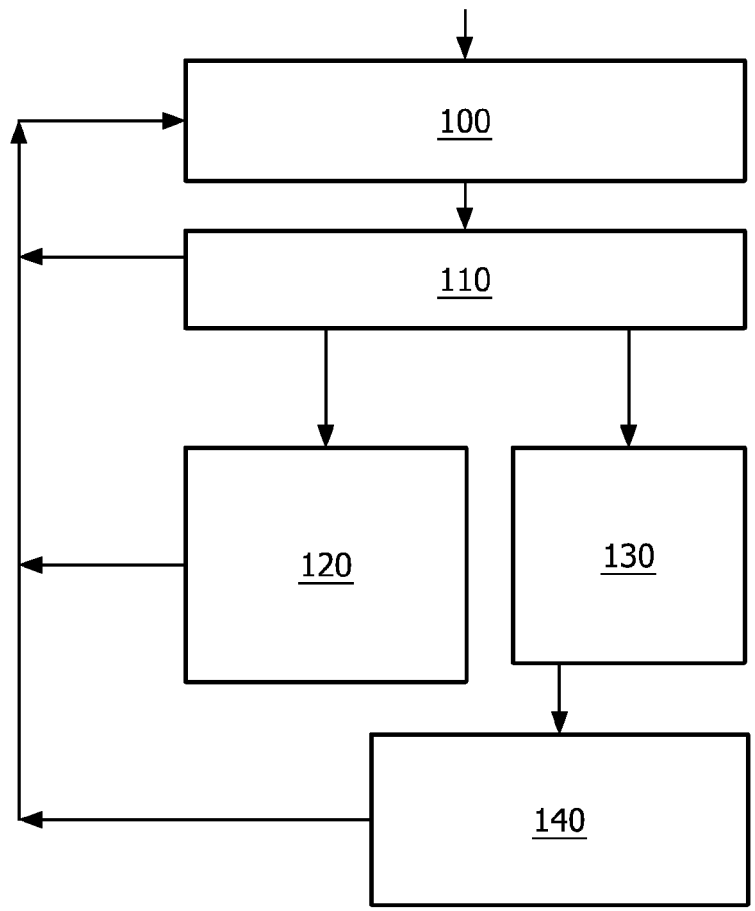
FIG. 5 shows a flow chart of a control process according to an embodiment.

FIG. 5 shows a flow chart of the control operation. At step 100 the controller 50 receives an indication of a change in channel conditions. At step 110 the controller 50 compares the channel conditions to thresholds. If there is a significant change in the channel conditions at step 130, this can cause a change in the type of processing of at least the worst channels. This leads to a change in data rates at step 140, to correspond to the new processing type for one or more of the demux streams. The controller 50 may aim to keep the overall data rate (combined over all demux streams) to a desired rate to match the data source by increasing the data rate of some demux streams and reducing the data rate of other demux streams. If there is a more moderate change in conditions, at step 120 the data rates of the worst channels, or the best channels, can be changed without a change in processing type. For a smaller change in channel conditions, no action is taken and flow returns from step 110 to step 100 where the process is repeated. Notably, at step 130, the more significant change in conditions can be made to cause a change of type of processing only if the change is prolonged beyond a given time threshold. This can make the control more stable and avoid frequent changes in processing type. The frequency of changes in processing type can be explicitly limited, while the frequency of changes to the data rates can be allowed to exceed this limit. Other parameters can also be used as inputs to the control of the processing and data rates. For example, the data source may specify a revised level of priority or quality of service for some or all of the data. This can be achieved by the controller 50 altering the data rates or the processing to reduce the data rate for higher quality for example. If applied to only some of the data, the demultiplexer 20 would need to be able to determine which is the higher quality data and ensure it is sent to the appropriate demux streams.

Figure 6:
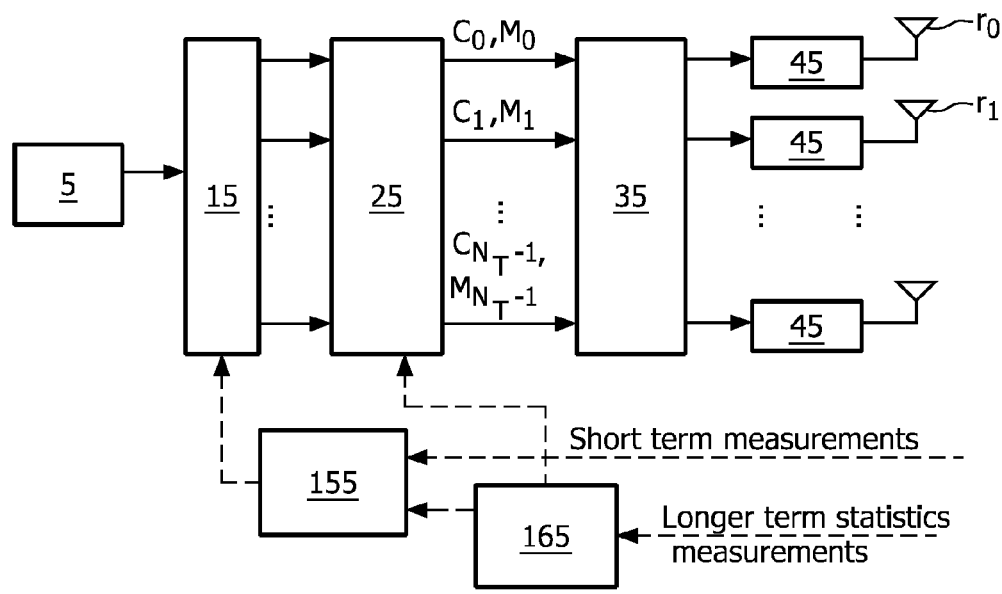
FIG. 6 shows a transmitter according to another embodiment.
Figure 7:
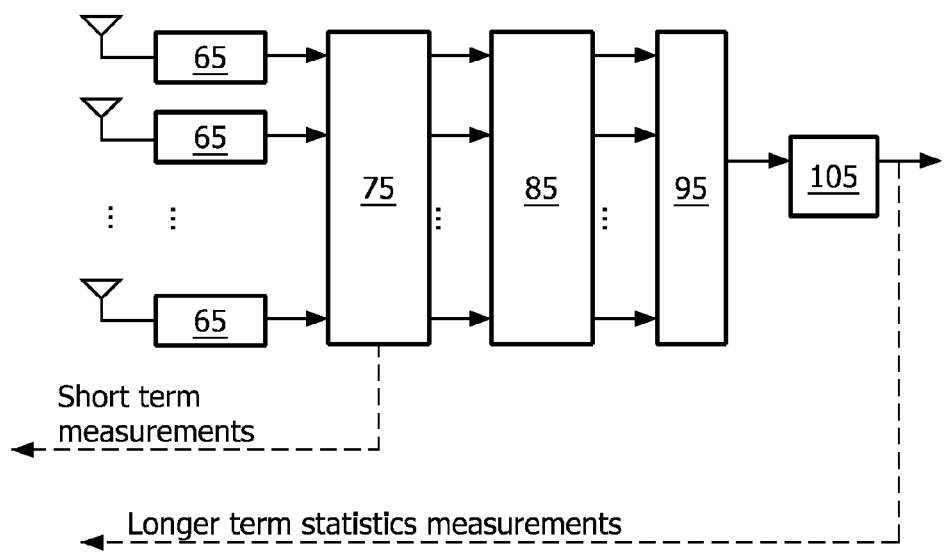
FIG. 7 shows a receiver according to another embodiment.
Figure 8:
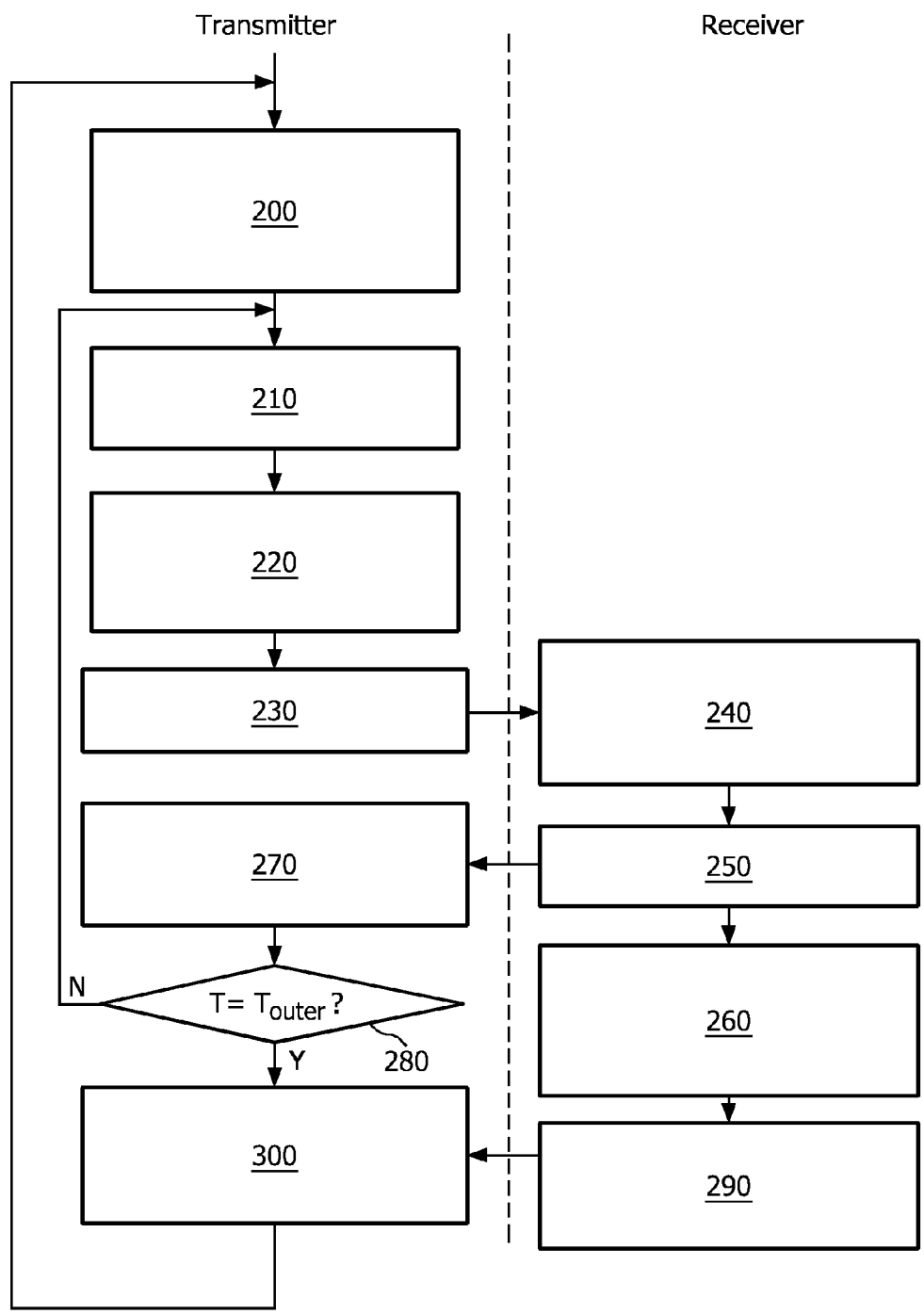
FIG. 8 shows a flow chart of operation of the embodiment of FIGS. 6 and 7.

Another embodiment is shown in FIGS. 6, 7 and 8. Similar reference numerals have been used where appropriate, to those used in FIGS. 1 and 2. FIG. 6 shows a block diagram of a transmitter having inner and outer control loops for use in a MIMO communication system. This embodiment employs two nested control loops to accomplish the data rate control; an outer loop controller 165 provides control based on a long term statistics metric delivered from a higher layer of a protocol stack after the re-multiplexer 95 in the receiver, and an inner loop controller 155 provides control based on a short term channel measurement feedback from the space-time processing part 75. As discussed above, other parameters can be fed back in addition or as alternatives. In an OFDM (Orthogonal Frequency Division multiplexed) system, the error rates can be sensitive to shifts in sub-carrier frequencies, so this can be detected and fed back.

The transmission parameter adjustment for each antenna is constrained by both the outer and inner control loop states simultaneously. The outer control loop determines a certain range of the transmission parameters adjustment, which the inner control loop should comply with. With the combined effect of the outer and inner control loops, the transmitter can achieve more reliable and moderate data rate control in difficult RF environments and provide higher performance for MIMO systems.

This is based on a recognition that ARC MIMO transmission parameters of each transmit antenna can be divided into two categories: shorter term parameters and longer term parameters. The shorter term parameters refer to parameters that could be modified almost simultaneously at both the transmitter and the receiver, such as the data rate of each demux stream. The longer term parameters are those which may lead to considerable delay time or configuration adjustment between the transmitter and receiver when modification occurs. As mentioned above, code rate and modulation mode are examples of longer term parameters.

As described above, to provide a system having a more reliable and stable data rate control together with sensitive channel tracking, while reducing complexity of ARC in the receiver, the shorter term parameters and longer term parameters are controlled by two separate control loops. These are the so called inner control loop and outer control loop. These two control loops can be mutually dependent for example by having a hierarchy of control loops.

The outer control loop is used for adjustment of longer term parameters based on a statistics metric delivered from a higher layer of a conventional protocol stack, such as PER (packet error rate) or BER (bit error rate). By using a higher layer, the metrics from multiple connections by multiple users can be aggregated. The statistics metric from the higher layer averages over a certain period the effect on performance of parameter adjustment of each transmit antenna, and can reflect changing channel trends and provide reliable indications for the adjustment in the next step. To prevent too acute and too frequent modification of parameters, the outer control loop can restrict the amount of, or rate of, adjustment of the shorter term parameters to within a certain range. Such an arrangement for the outer control loop can reduce the frequency of adjustment of longer term parameters on the basis of more reliable feedback, and consequentially lower the complexity of the receiver. The outer control loop may run in closed loop mode using feedback from receiver, and the time interval between control adjustments may be set at one or more frame periods as defined by an applicable air interface standard for the communication system, to provide a long enough period for establishing reliable feedback statistics.

The inner control loop is responsible for fine-tuning of shorter term parameters with a much shorter period as compared with outer control loop. The inner control loop runs so as to complement the operation of the outer control loop and should comply with the restriction imposed on shorter term parameters adjustment within in a certain range. The inner control loop may work in either close loop mode or open loop mode, and the control interval can be set as a number of time slots, again as defined by an applicable air interface standard of the communication system, for timely parameter adjustment. Normally, the measurements used for the inner control loop are derived from spatial channel parameters directly, such as SINR, and are even the channel parameters themselves. The feedback can be sent over signalling paths multiplexed with the payload information following established practice.

To improve the reliability of the shorter term parameter adjustment and also to reduce the complexities of data stream de-multiplexing and re-multiplexing at the transmitter and receiver respectively, the invention employs consecutive shorter term parameter control instead of a conventional discrete one. For example, the data rate $r_i$, i=0, 1, ... $N_{T-1}$ on the respective transmit antennas, should comply with the constraints of equation 1.

$$r_i(t + t_p) = \begin{cases} r_i(t) + \Delta & \text{if } \Delta_i^{SINR}(t) \geq T_r \text{ and } SINR_i(t + t_p) < SINR_i^{up} \\ r_i(t) & \text{if } T_l < \Delta_i^{SINR}(t) < T_r \\ r_i(t) - \Delta & \text{if } \Delta_i^{SINR}(t) \leq T_l \text{ and } SINR_i(t + t_p) > SINR_i^{down} \end{cases} \quad (1)$$

In equation 1, $t_p$ represents the control period and $SINR_i(t)$ denotes the received SINR corresponding to the ith transmit antenna at time t at the receiver. Constants $SINR_i^{up}$ and $SINR_i^{down}$, are current adjustment bounds on the ith transmit antenna which are determined by the outer control loop. $T_r$ and $T_l$ are thresholds for increasing or reducing the data rate on the ith transmit antenna and $\Delta$ is the rate adjustment step that usually should be a common divisor of all possible data rate values on channels. The variable $\Delta_i^{SINR}(t)$ is defined by equation (2)

$$\Delta_i^{SINR}(t) = SINR_i(t+t_p) - SINR_i(t) \quad (2)$$

Equation (1) shows that each data rate at a next time interval can be increased, decreased or stay the same, and shows the conditions for each of these three options.

The inner control loop can only maintain or change the shorter term parameters with a certain step according to the short term measurement feedback in one control period. Some adjustment parameters in the inner control loop, such as $SINR_i^{up}$ and $SINR_i^{down}$, are determined by the outer control loop based on more reliable measurements, for example packet error rate (PER) fed back from the receiver, to prevent accumulation of adjustment errors. FIG. 7 shows a receiver which can provide this feedback. An alternative to providing the feedback of PER would be to use an average of all the channel SINRs, averaged over some time. This would have the disadvantage of not enabling the receiver processing parts 85 to be within the longer term control loop.

FIG. 8 illustrates the rate control procedure of the invention in a flow chart. Initially, the transmission parameters of the MIMO communication system are set to pre-determined initial values. These parameters include the short term parameters such as the data rate $r_0, r_1, \ldots, r_{N_T-1}$, on each transmit antenna, adjustment limits $SINR_i^{up}$ and $SINR_i^{down}$, and the longer term parameters in the outer control loop such as code rate $C_0, C_1, \ldots, C_{N_T-1}$ and modulation mode $M_0, M_1, \ldots, M_{N_T-1}$ of each transmit antenna.

Then the MIMO communication system starts both outer and inner control loops simultaneously. Typically, the outer control loop has a control period $T_{outer}$ which is a multiple of the period $T_{inner}$ of the inner control loop, so $T_{outer}=N \cdot T_{inner}$ where N is an integer. At step 200 the transmitter sets transmission parameters of each antenna, including modulation mode, code rate and adjustment limits. During the outer loop control period, all longer term parameters and limits on the adjustment of shorter term parameter remain fixed, and only short term parameters are periodically changed according to equation (1). At step 210 the data rates $r_0, r_1, \ldots, r_{N_T-1}$ are set according to the outer control loop result. At step 220 the user data stream is split into demux streams according to the data rates $r_0, r_1, \ldots, r_{N_T-1}$, and modulation $M_0, M_1, \ldots, M_{N_T-1}$ and coding $C_0, C_1, \ldots, C_{N_T-1}$ applied respectively. At step 230 all space-time processed demux streams are transmitted via the $N_T$ antennas.

At step 240 the receiver receives all signals via $N_R$ antennas, and measures the SINR of each spatial channel, to get $SINR_0, SINR_1, \ldots, SINR_{N_T-1}$, and at step 250 an indication of these values is fed back to the transmitter. At step 260 the receiver continues the space-time processing and recovers all $N_T$ demux streams, and reassembles them in order, and delivers the data to higher layers of a protocol stack. At step 290 the receiver takes a statistics measurement, for example PER or BER, from the higher layers and transmits this to the transmitter.

At step 270 the transmitter receives the feedback of $SINR_0, SINR_1, \ldots, SINR_{N_T-1}$ from the receiver and updates the shorter term parameters $r_0, r_1, \ldots, r_{N_T-1}$. At step 280, if the time T has reach $T_{outer}$ then the outer control loop operates with flow returning to step 200, otherwise steps 210 to 270 are repeated. During each period $T_{outer}$, all short term parameter bounds and longer term parameters remain fixed, and only the short term parameters are periodically changed according to equation 1.

After each N inner loop control periods (i.e. one outer loop control period), at step 300 the outer control loop operates to update the longer term parameters $SINR_i^{up}$, $SINR_i^{down}$, $C_0, C_1, \ldots, C_{N_T-1}, M_0, M_1, \ldots, M_{N_T-1}$, for each antenna according to fed back statistics corresponding to each transmit antenna during previous N inner control periods. Then the flow returns to step 200 and the inner control loop runs with the updated parameters. The whole procedure runs repeatedly with a period of $T_{outer}$.

FIG. 9 shows a graph of frame error rate PER versus channel SNR, for two known arrangements and for an embodiment of the invention. The upper line shows the errors for a known BLAST system, the middle line is for a known PARC system, and the lower line is for an embodiment of the invention. This shows that for a given SNR value, the embodiment can achieve a considerably lower error rate than either of these known systems.

The present method for rate control is applicable for both uplink and downlink in a MIMO communication system. As discussed above, embodiments can help avoid the first problem of accumulation of bit errors over the longer term leading to ARQs if control is not rapid enough to match rapid channel condition changes, while also addressing the second problem of processing overload in the receiver if changes in coding are too frequent.

The controller can be implemented using a conventional general purpose digital computer or microprocessor programmed according to the teachings of the present specification, as will be apparent to those skilled in computers. Appropriate software coding can readily be prepared by skilled programmers based on the teachings of the present disclosure, as will be apparent to those skilled in software.

Embodiments may also be implemented by the preparation of application specific integrated circuits or by interconnecting an appropriate network of conventional component circuits, as will be readily apparent to those skilled in the art.

Embodiments may also be implemented by a computer program product, in particular the methods of control, on a storage medium including instructions which can be used to program a computer to perform a process of the invention. The storage medium can include, but is not limited to, any type of disk including floppy disks, optical discs, CD-ROMs, and magneto-optical disks, ROMs, RAMs, EPROMs, EEPROMs, magnetic or optical cards, or any type of media suitable for storing electronic instructions.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art within the scope of the claims.

In the present specification and claims the word "a" or "an" preceding an element does not exclude the presence of a plurality of such elements. Further, the word "comprising" does not exclude the presence of other elements or steps than those listed.

The inclusion of reference signs in parentheses in the claims is intended to aid understanding and is not intended to be limiting.

The invention claimed is:

1. A transmitter for transmitting information using multiple spatial wireless channels, comprising:
    a demultiplexer arranged to derive two or more demux streams carrying different parts of the information, at respective data rates;
    a stream processor for processing the demux streams before transmission over the channels; and
    a controller arranged to vary the processing according to channel conditions, the controller additionally being arranged to control the data rates according to conditions of the channels independently of the variations in the processing;
    wherein the controller is arranged to control the data rates more frequently than the variations in the processing; and
    wherein an outer loop controller provides control based on long term parameters comprising a long term statistics metric delivered from a higher layer of a protocol stack and an inner loop controller provides control based on short term parameters comprising short term channel measurement feedback from a space-processing part, the outer control loop and inner control loop being mutually dependent.

2. The transmitter of claim 1, wherein the controller is arranged to vary the data rates relative to each other and maintain an overall data rate to suit a data source.

3. The transmitter of claim 1, wherein the stream processor includes at least one of: an error detection encoder, an error correction encoder, and a modulator.

4. The transmitter of claim 1, wherein the controller is arranged to control the data rates within a variable range, the range being varied with a slower response than the control of the data rates.

5. The transmitter of claim 1, wherein the controller is arranged to receive feedback of the shorter term channel conditions and of a longer term overall error rate from a receiver.

6. The transmitter of claim 5, wherein the controller is arranged to control the data rates according to the channel conditions within constraints determined according to the longer term overall error rate.

7. The transmitter of claim 5, wherein the controller is arranged to vary the processing at a lower frequency than an update frequency of the data rates, the variation being according to the longer term overall error rate.

8. A baseband processor for a transmitter, comprising:
a demultiplexer arranged to derive two or more demux streams carrying different parts of the information, at respective data rates;
a stream processor for processing the demux streams before conversion to a radio frequency for transmission over the channels; and
a controller arranged to vary the processing according to channel conditions, the controller additionally being arranged to control the data rates according to conditions of the channels independently of the variations in the processing;
wherein the controller is arranged to control the data rates more frequently than the variations in the processing; and
wherein an outer loop controller provides control based on long term parameters comprising a long term statistics metric delivered from a higher layer of a protocol stack and an inner loop controller provides control based on short term parameters comprising short term channel measurement feedback from a space-processing part, the outer control loop and inner control loop being mutually dependent.

9. A method of transmitting information, the method comprising:
deriving two or more demux streams carrying different parts of the information, at respective data rates;
processing each demux stream before transmission over the channels;
varying the processing according to channel conditions; and
controlling the data rates according to conditions of the channels independently of the variations in the processing;
controlling long term parameters comprising a long term statistics metric delivered from a higher layer of a protocol stack via an outer loop controller; and
controlling short term parameters comprising short term channel measurement feedback from a space-processing part via an inner loop controller;
wherein the data rates controlled more frequently than the variations in the processing; and the outer control loop and inner control loop being mutually dependent.

10. The method of claim 9, wherein the data rates are varied relative to each other to maintain an overall data rate to suit a data source.

11. The method of claim 9, wherein the processing includes at least one of: an error detection coding, an error correction coding, and modulating.

12. The method of claim 9, wherein the data rates are controlled within a variable range, the range being varied with a slower response than the control of the data rates.

13. The method of claim 9, further comprising receiving feedback of the shorter term channel conditions and of a longer term overall error rate from a receiver.

14. The method of claim 9, wherein the data rates are controlled according to the channel conditions within constraints determined according to the longer term overall error rate.

15. The method of claim 9, wherein the variation of the processing are updated at a lower frequency than an update frequency of the data rates, and being according to the longer term overall error rate.

* * * * *